W. N. Whiteley, Jr.
Harvester Rake.
N° 65030  Patented May 21, 1867.

Witnesses:
Thos A Connolly
Thomas T Parker

Inventor:
Wm N Whiteley, jr
By his atty R D O Smith

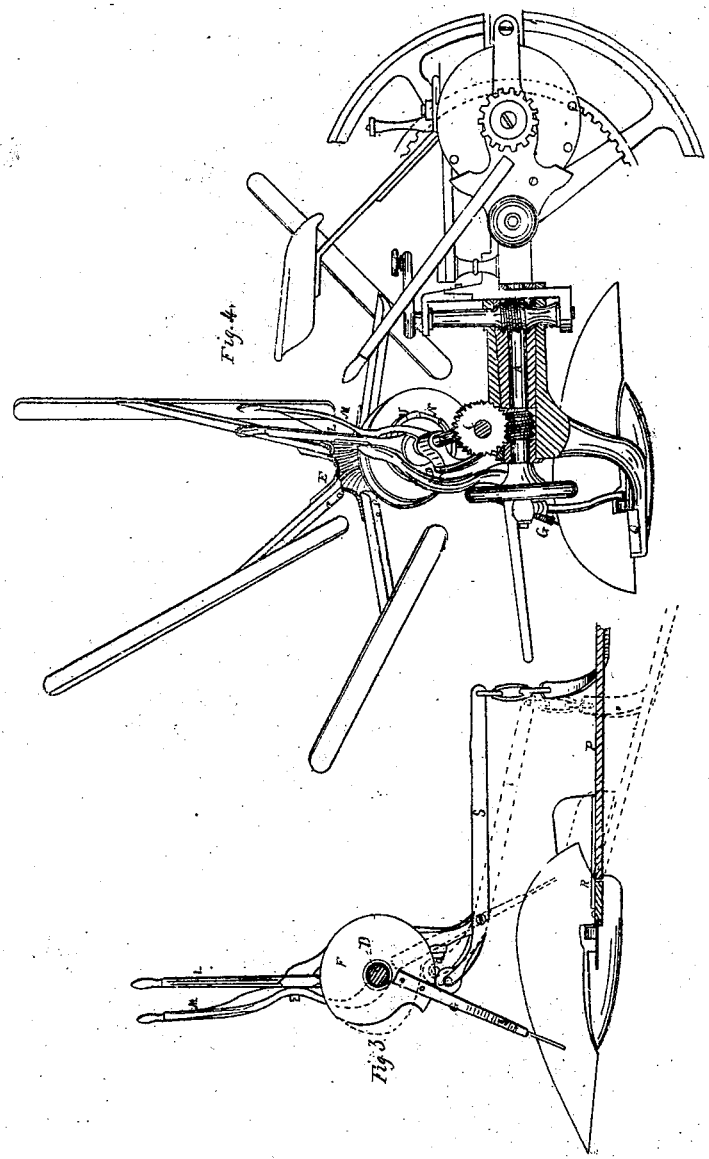

UNITED STATES PATENT OFFICE.

WILLIAM N. WHITELEY, JR., OF SPRINGFIELD, OHIO.

IMPROVEMENT IN HARVESTER-RAKES.

Specification forming part of Letters Patent No. 65,030, dated May 21, 1867.

*To all whom it may concern:*

Be it known that I, WILLIAM N. WHITELEY, Jr., of Springfield, in the county of Clarke and State of Ohio, have invented a new and useful Improvement in the Construction of Reaping-Machines; and I do hereby declare the following to be a full, clear, and distinct description of the same, reference being had to the accompanying drawings, in which—

Figure 1:
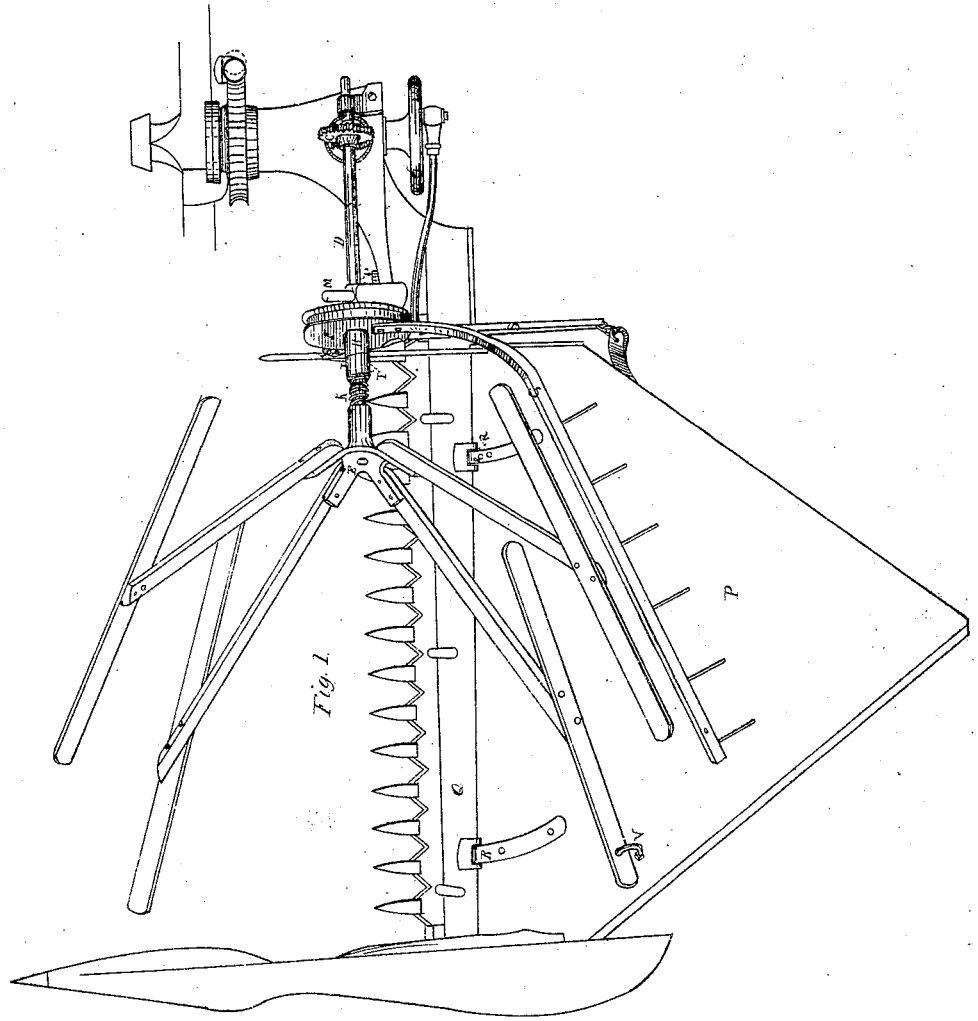
Figure 2:
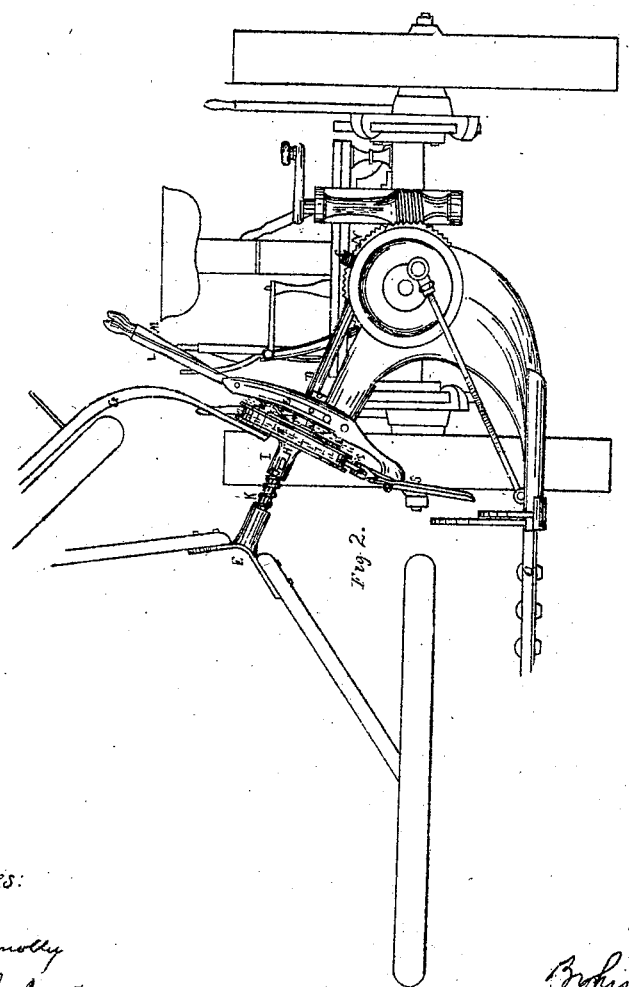

Figure 1 is a plan view of a machine embracing that part of my invention included in this application. Fig. 2 is a rear elevation of the same. Fig. 3 is an elevation of that side of my machine which is nearest the cutting apparatus. Fig. 4 is a vertical logitudinal section through the coupling-arm, hub, main frame, &c., showing the cutters, crank-shaft, and the method of driving the reel.

My invention consists, first, in the method of operating the reel and automatic rake (when used) by means of a worm-screw upon the cutter's crank-shaft; second, in arranging a quadrant-shaped platform to deliver the grain at the side by dropping; third, in operating a dropping platform by a cam attached to the rake and a lever attached to the platform; fourth, in the arrangement of devices for unshipping the rake and holding it out of gear; fifth, in the devices for retaining the rake and platform in one position out of gear.

That others skilled in the art may understand the construction and operation of my invention, I will particularly describe it.

The main frame, driving-gear, and couplings which are represented in this application are particularly described in the other division filed herewith; but they do not form any part of the invention set forth and claimed in this application.

The coupling-arm which connects the cutting apparatus to the main frame, and also supports the reel and automatic rake, is so connected to the main frame that its axis of motion is coincident with the axis of motion of the cutter's crank-shaft, and the cutting apparatus therefore rises and falls with the undulations of the ground in the arc of a circle, of which the axis of the crank-shaft is the center. The same specification includes the reel and automatic rake, when one is used.

The cutter's crank-shaft A is provided, near its outer end, with a worm-screw, B, into which gears the worm-wheel C, which is set upon the reel-shaft D. The reel-shaft is provided with proper bearings near each end to support it, and to retain it and the reel in proper position. The reel-head E is set and rigidly secured to the outer end of the shaft D. The operation of the reel does not differ from that of any other reel of the same class. The cam F is placed upon the reel-shaft loosely, just outside of its outer bearing, and to the side of it is secured the rake-arm G.

In the end of the sleeve of the cam F are four equidistant notches, H, into one of which the clutch-pin I will enter when the cam is moved up to it to be thrown into gear. The clutch-pin is covered by the sleeve J when the rake is not in gear, said sleeve being pressed forward for that purpose by the spring K. The cam F is provided with a groove on its inner side, into which the fork of the clutch-lever L rests. The stop-lever M rests its lower end just over the joint between the inner side of the cam F and the shoulder of the outer bearing, so that as the clutch-lever L moves the cam F forward upon the shaft to bring it into gear with the clutch-pin I, the lower end of M drops upon the shaft D, between the cam and the shoulder of the outer bearing, so that the cam cannot return or slip out of gear.

When it is desired to throw the rake out of gear, it is only necessary to press backward the upper end of M, and thus raise the lower end from the shaft, when the spring K immediately throws the cam away from the clutch-pin. It is desirable that it should only be possible to throw the rake out of gear when not over the platform or in a position to interfere with the falling grain. To accomplish this purpose I make a rim or flange, U, upon the inner side of the cam F, and place upon some suitable stationary part the adjustable stop O, which is so set that when the rake is in gear the end of the stop O will barely clear the edge of the flange U; and when the lever M is removed from the shaft D, then the flange U will rub against the stop O and be prevented thereby from going out of gear until the notch N, which is made in the flange U for that purpose, comes opposite the end of the stop O, when the rake and cam F are immediately thrown back out of gear, the stop O resting in the notch N, and preventing any further movement of the rake until it is again thrown into gear by the lever L.

The cam F is in form substantially as shown in Fig. 3. The platform P is quadrant or triangular shaped, and the grain is delivered at the side, so that a clear space is left between the cut and standing grain, in which the machine may pass during the next round. It is attached to the finger-bar Q by hinges R R.

When the gavel is to be delivered, the platform drops at the rear edge, so that the heads of the grain upon it catch in the standing stubble, and the gavel slides off from the platform in very satisfactory order. The dropping of the platform is automatic, and is accomplished by means of the cam F and lever S, to which the edge of the platform is attached by a chain. The friction-roller T is placed at the forward end of the lever S, to reduce the friction and wear between the cam and the lever.

At every revolution of the cam F the friction-roller T and front end of lever S pass into the depression of the cam-surface, and the rear edge of the platform is permitted to drop. The surface of the cam quickly rises again, and the platform is elevated.

If the grain is sufficiently heavy, the operation of the rake and the dropping platform may go on uninterruptedly; but if the grain is light, so that not enough for a gavel is cut at one revolution of the reel, the rake may be thrown in and out of gear as often as desired or necessary to secure the proper quantity of grain at each stroke and delivery.

When it is desired that the rake should act uninterruptedly, it may be coupled to one of the blades of the reel by the link V.

The outer end of the cutting apparatus may be supported upon a grain-wheel in the usual manner. The rake in its revolutions strikes in and divides the standing crop, presses it to the cutters, and finally moves the gavel backward far enough to enable the platform to deliver it when dropped.

Having described my invention, what I claim as new, and desire to secure by Letters Patent, is—

1. Driving the rake and reel directly by means of a worm-screw on the cutter's crank-shaft and a worm-gear on one end of the reel-shaft, substantially as shown and described.

2. The quadrant-shaped dropping platform P, hinged to the finger-bar, substantially as and for the purpose set forth.

3. The combination of the quadrant-shaped platform P with the rake G, arranged to operate in conjunction with said platform, substantially as described.

4. The combination of the rake G, the cam F, and quadrant-shaped dropping platform P, so arranged that the dropping of the platform is dependent upon the movement of the rake, substantially as described.

5. In combination with the dropping platform P and rake G, the stop O, substantially as and for the purpose set forth.

6. The combination of the clutch-lever L and the stop-lever M, substantially as and for the purpose set forth.

7. The combination of the cam F, lever S, and dropping platform P, substantially as and for the purpose set forth.

WILLIAM N. WHITELEY, JR.

Witnesses:
S. D. CARPENTER,
GEO. ARTHUR.